United States Patent [19]

Wada et al.

[11] Patent Number: 5,198,305
[45] Date of Patent: Mar. 30, 1993

[54] OPTICAL ELEMENT SUBSTRATE

[75] Inventors: Akihiro Wada, Inagi; Rin-ichi Kakuta, Tokyo, both of Japan

[73] Assignee: Asahi Kasei Kogyo Kabushiki Kaisha, Osaka, Japan

[21] Appl. No.: 814,229

[22] Filed: Dec. 23, 1991

Related U.S. Application Data

[63] Continuation of Ser. No. 481,694, Feb. 20, 1990, abandoned, which is a continuation of Ser. No. 136,917, Dec. 22, 1987, abandoned.

[30] Foreign Application Priority Data

Dec. 25, 1986 [JP] Japan .................. 61-308041

[51] Int. Cl.$^5$ ................ B32B 15/08; C08F 20/10
[52] U.S. Cl. ................ 428/463; 526/318.45; 526/937; 528/481; 525/329.7
[58] Field of Search ............. 526/318.45, 937, 262; 528/481; 525/329.7; 428/463

[56] References Cited

U.S. PATENT DOCUMENTS 3,137,660  6/1964  Jones ................ 526/238.2
4,742,123  5/1988  Kopchik ............ 525/329.7

FOREIGN PATENT DOCUMENTS

| | | |
|---|---|---|
| 0264508 | 4/1988 | European Pat. Off. . |
| 57-33446 | 2/1982 | Japan . |
| 57-162135 | 10/1982 | Japan . |
| 58-88843 | 5/1983 | Japan . |
| 58-217501A | 12/1983 | Japan . |
| 59-108012 | 6/1984 | Japan . |
| 60-133004 | 7/1985 | Japan . |
| 60-136791A | 7/1985 | Japan . |
| 60-138803A | 7/1985 | Japan . |
| 1437176 | 5/1976 | United Kingdom . |

OTHER PUBLICATIONS

Chemical Abstracts 104:34525f (1986), pp. 13–14.

*Primary Examiner*—Joseph L. Schofer
*Assistant Examiner*—Alex H. Walker
*Attorney, Agent, or Firm*—Birch, Stewart, Kolasch & Birch

[57] ABSTRACT

A novel optical element substrate which comprises a random copolymer comprising, in specific weight proportions, a methyl methacrylate unit, an aromatic vinyl compound unit, an unsaturated aliphatic acid unit and a hexagonal acid anhydride unit of the formula

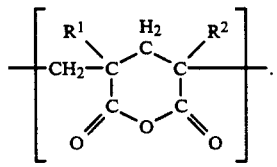

The substrate has excellent heat resistance, thermal stability, transparency, resistance to scratching and metal layer corrosion preventive properties and exhibits advantageously low double refraction and warpage. The novel substrate can be advantageously employed as a substrate for an optical element such as an optical disc, e.g. a digital audio disc, a video disc and a disc capable of being directly read after recording, a mirror, a lens and the like.

11 Claims, 1 Drawing Sheet

OPTICAL ELEMENT SUBSTRATE

This application is a continuation of application Ser. No. 07/481,694 filed on Feb. 20, 1990, now abandoned, which is a continuation of application Ser. No. 07/136,917 filed on Dec. 22, 1987 now abandoned.

BACKGROUND OF THE INVENTION

1. Field Of The Invention

The present invention relates to a novel optical element substrate. More particularly, the present invention is concerned with an optical element substrate comprising a random copolymer comprising a methyl methacrylate unit, an aromatic vinyl compound unit, an unsaturated aliphatic acid unit and a hexagonal acid anhydride unit in specific weight proportions, which substrate has excellent heat resistance, thermal stability, transparency, resistance to scratching and metal layer corrosion preventive properties and exhibits advantageously low double refraction and warpage. The term "optical element substrate" as used herein defines a substrate body for an optical element. The term "optical element" as used herein defines all types of elements which utilize light transmission, refraction, reflection and other optical characteristics. Representative examples of optical elements include an optical disc such as a digital audio disc, a video disc and a disc which is capable of being directly read after recording, a mirror, a lens and the like. The optical disc substrate according to the present invention is especially suited for a high-density information medium for use in a recording and playback apparatus. This apparatus converts analogue information into digital information and records the digital information in a recording medium at a high packing density by means of a laser beam. Further, due to the convenience and advantage of the apparatus, it has become the object of public attention.

2. Discussion Of Related Art

The term "optical disc" as mentioned above and used hereinafter defines an information disc which is read optically in reflection, and includes, for example a digital audio disc (DAD), a video disc (VD), a so-called direct read after write (DRAW) disc and a so-called erasable direct read after write (E-DRAW) disc.

In a DAD, audio information, which has been finely divided into signals and converted into a binary number system of "0" and "1", is recorded, on a layer capable of reflecting a laser beam, e.g., a metal layer, as a relief structure having a crenellated profile of areas situated alternately at a higher and a lower level (information bits), sometimes termed blocks and pits. The relief structure is read by means of a laser beam, and the signals of the laser beam, according to the binary number system, are converted into electrical signals and then played back as sound. In general, such a disc having a relief structure of a metal layer capable of reflecting a laser beam, is obtained by molding a transparent resin into a disc-form substrate having a relief structure and, forming on the relief structure surface, a metal layer by vacuum evaporation coating or the like.

Image information can likewise be recorded as a relief structure on a metal layer capable of reflecting a laser beam to give a VD.

Computer programs and data can also be recorded on an optical disc as relief structures, to give an optical disc which is usable as an information disc of computer programs and data. Discs such as information discs for computers or a disc which is capable of being directly read after writing or recording (DRAW disc), are especially drawing attention. Further, an optical disc which is capable of being written on and erased [erasable direct read after write disc (E-DRAW disc)] is now being developed. In the field of DRAW discs, there are employed various types of recording layers. Examples of such recording layers include (1) a layer in which holes are formed by irradiation of a laser beam, (2) a layer in which formation of bubbles by irradiation of a laser beam is utilized, and (3) a layer in which the magnetic direction is changed by irradiation of a laser beam. The recording layer of the above type (3) is usable for E-DRAW discs.

To read the relief structure in the above-mentioned various optical discs by means of a laser beam, the laser beam interference, which is caused by the phase difference between a laser beam directly incident on a detector and a laser beam traversing the substrate and reaching the detector, must be detected. Therefore, the resin to be used as the material for a substrate for optical discs must satisfy the following requirements:

(1) the resin must have a high laser beam transmission;

(2) after the resin has been molded into a disc substrate, the orientation of the molecules in the resin must be small so that the double refraction of the laser beam is small;

(3) after the resin has been molded into a disc substrate, the refraction index of the resin must not vary over the disc;

(4) the resin must not contain contaminants;

(5) the resin must have good heat distortion resistance;

(6) the resin must be susceptible to good vacuum evaporation of a metal;

(7) the resin must have good molding properties and be capable of being molded into a disc substrate with a sharp pit pattern;

(8) the resin must have good adhesion to a reflective layer, (9) after the resin has been molded into a disc substrate, the thickness must be uniform over the disc; and

(10) after the resin has been molded into a disc substrate, the disc must be stable with respect to freedom from warpage with the passing of time.

In addition to the above requirements, the resin should not contain impurities such as the polymerization solvent, and should not be hydrolyzable.

Heretofore, polymethyl methacrylate (PMMA) has been used as a material for substrates for optical discs. However, the moisture absorption of PMMA is high and, hence, an optical disc utilizing PMMA as the material for its substrate would in time become warped, due to the absorption of moisture by the substrate. In order to eliminate this drawback, there has been proposed an optical disc in which a substrate made from a PMMA resin is coated with a resin having good barrier properties to water, such as polyvinylidene chloride. However, for preparing such a disc, a troublesome step is required.

A polycarbonate resin also has been used as a material for a substrate for optical discs. However, the substrate made of this resin is defective in that it inherently contains impurities such as chromium and dichloromethane which would deteriorate the reflective layer. The contamination of the substrate with chromium is caused during the molding of the resin which is usually conducted at high temperatures. The contamination of the substrate by dichloromethane is caused by the dichloromethane having been used as the polymerization solvent and which has not been removed. Further, the substrate made of the polycarbonate resin, would in time become hydrolyzed, and this would lead to a deterioration of the adhesion of the reflective layer which is adhered to the substrate.

Further, optical discs have been proposed in which a copolymer of methyl methacrylate and styrene (methyl methacrylate/styrene=60/40 or 30/70 by weight) is used as the material for substrates (see Japanese Patent Application Laid-Open Specifications Nos. 57-33446/1982 and 57-162135/1982). However, these substrates are deficient in heat distortion resistance and the double refraction thereof is disadvantageously high.

The present inventors previously proposed an optical disc substrate made of a resin comprising a copolymer of a methacrylic acid ester and a monoalkenyl aromatic compound (see Japanese Patent Application Laid-Open Specification No. 58-88843/1983). This substrate substantially satisfies the standard requirements for DADs having a diameter of 120 mm and a thickness of 1.2 mm. However, it is difficult for this substrate to satisfy the standard requirements for DRAW discs having a diameter of 300 mm and a thickness of 1.2 mm. Illustratively stated, due to the increased diameter of DRAW discs, the distance in which a molten resin, when subjected to injection molding, flows from the center portion to the edge portion of the mold, becomes large as compared with the case of the molding of DADs. Thus, the orientation of the molecules of the molten resin is likely to occur, which leads to an increase in double refraction. Therefore, it is difficult for the substrate made from this resin to have a double refraction as small as 40 nm or less, such being required as the standard value for DRAW discs, and further as small as 20 nm or less, such being required as the standard value for E-DRAW discs.

The present inventors further proposed an optical disc substrate made of a resin comprising a copolymer which is obtained by copolymerizing 40 to 70 parts by weight of methyl methacrylate, 5 to 20 parts by weight of an ester of a methacrylic acid and a saturated aliphatic monohydric alcohol having 3 to 6 carbon atoms, and 25 to 40 parts by weight of a monoalkenyl aromatic compound, the copolymer having a solution viscosity of 3 to 10 cps as measured at 25° C. with respect to a 10% solution of the copolymer in methyl ethyl ketone and having a double refraction of 100 nm or less (see Japanese Patent Application Laid-Open Specification No. 59-108012/1984). This substrate is satisfactory in double refraction and moisture absorption. However, this substrate is deficient in the heat resistance required when a reflective layer is being formed on the substrate by sputtering or the like, and is defective in that creeping is likely to occur when a disc using the substrate is leaned and stored for a long period of time under warm conditions.

Also, as disclosed in Japanese Patent Application Laid-open Specification No. 60-133004/1985, it has been proposed to employ as an optical high-density information recording medium a resin of a copolymer comprising a methyl- methacrylate unit, an ester unit as obtained by esterification of methacrylic acid with a monovalent saturated aliphatic alcohol having 3 to 6 carbon atoms, a monoalkenyl aromatic unit, an unsaturated aliphatic acid unit and/or a hexagonal acid anhydride unit. The deformation temperature of this resin is as low as 70° to 85° C., presumably due to the incorporation into the resin of $C_3$-$C_6$ ester units in an amount as large as from 4 to 16% by weight, based on the weight of the resin. Accordingly, when an optical disc comprising this resin as a substrate is mounted on a hardware having recording and playback functions and operated over a prolonged period of time, thereby causing the temperature of the disc to increase up to, for example, about 60° C. or more, warpage of the disc occurs. This warpage adversely affects the recording and playback of the hardware.

With respect to a mirror, the conventional process for manufacturing the same comprises applying a reflective metal layer to the whole reverse side of a glass substrate according to any one of the vacuum evaporation coating technique, sputtering technique, ion plating technique and the like, optionally followed by further application of a protective layer. Recently, the employment of plastics as a mirror substrate in place of glass has become desired in the art, especially in the field of a mirror for vehicles, due to the advantages of the plastic substrate in lightweightness, mass production facility and impact resistance, as compared with the glass substrate. The demand for a plastic mirror is rapidly increasing since in the case of a plastic mirror, it is more facile to meet the recent requirements for a color mirror and a mirror endowed with anti-glare properties.

A representative example of the plastics employed as a substrate for a plastic mirror is a polymethyl methacrylate resin. However, this resin is by nature hygroscopic. Therefore, the mirror as fabricated by applying a non-hygroscopic reflective layer of a metal to the surface of one side of the polymethyl methacrylate substrate inherently has a problem of warping due to the absorption of moisture from the open side of the mirror remote from the reflective layer. Accordingly, the use of the plastic substrate is limited, and in particular, this substrate has not yet been realized as being acceptable as a mirror substrate in vehicles.

With respect to a lens, as in the case of a mirror, the demand for a plastic product is rapidly increasing due to its advantages in lightweightness and mass productivity. Representative examples of the plastics employed for a plastic lens are a polymethyl methacrylate resin, a polycarbonate resin and an allyldiglycol carbonate resin. The polymethyl methacrylate resin is highly hygroscopic and hence has poor dimensional stability, so that lenses comprising the resin as a substrate cannot be suitably employed in a precision optical instrument. The temperature up to which the polymethyl methacrylate resin is heat resistant is only about 80° to 90° C., even under absolute dry conditions. The temperature is decreased by the absorption of moisture by the resin. Accordingly, when the lens comprised of the resin is used in an environment having an elevated temperature, for example near the lamp of a car, the lens must be thick so as to prevent the lens from being deformed by the heat. The necessity of being thick is disadvantageous from the viewpoint of manufacturing cost. Moreover, the refractive index of the polymethyl methacrylate resin is as low as 1.49. Accordingly, the focal distance of the lens comprised of the resin is of great length, thereby causing the manufacturing of a thin lens to be difficult.

On the other hand, with respect to a polycarbonate resin, it has a drawback in that its light transmission is as low as about 88%. In the polycarbonate resin, a molecular orientation tends to occur, and hence a double refraction disadvantageously tends to occur. The polycarbonate resin has a low hardness in terms of Rockwell hardness or pencil hardness as defined later. Therefore, the lens comprised of the resin is susceptible to scratches, and when it is used for a prolonged period of time, its surface whitens, thereby bringing about the disadvantage of diffused reflection.

An allyldiglycol carbonate resin which is a thermosetting resin is generally used for producing a lens. Due to the thermosetting properties, this resin is accompanied by shrinkage at the time when the lens is being fabricated. Therefore, post-treatment is necessary for the resin. For the foregoing reason, the major use of the allyldiglycol carbonate resin is limited to a lens for glasses. However, this resin is not useful for the fabrication of high-precision, mass-production lenses such as a finder lens, a condenser lens, a floodlight lens, an electric flash diffuser lens and a photographing lens for a camera, and such as a non-spherical surface lens and a television video projector lens which are employed with a compact disc player. The refractive index of the allyldiglycol carbonate resin is as low as about 1.50. Accordingly, as in the case of a polymethyl methacrylate resin, the focal distance of the lens comprised of this resin is of great length, and hence it is difficult to obtain a thin lens by the use of this resin.

SUMMARY OF THE INVENTION

With a view toward developing an optical element substrate which is free from the above-mentioned drawbacks of the conventional substrates, the present inventors have conducted extensive and intensive investigations. As a result, the present inventors have unexpectedly found that a random copolymer comprising a methyl methacrylate unit, an aromatic vinyl compound unit, an unsaturated aliphatic acid unit and a hexagonal acid anhydride unit in specific weight proportions provides a substrate for an optical element such as an optical disc, a mirror, a lens and the like, which substrate has excellent heat resistance, thermal stability, transparency, resistance to scratching and metal layer corrosion preventive properties and exhibits advantageously low double refraction and warpage. The present invention is based on this novel, unexpected finding.

Accordingly, it is an object of the present invention to provide a novel optical element substrate having excellent heat resistance, thermal stability, transparency, resistance to scratching and metal layer corrosion preventive properties and which advantageously exhibits low double refraction and warpage.

The foregoing and other objects, features and advantages of the present invention will be apparent from the following detailed description and appended claims taken in connection with the accompanying drawings in which:

BRIEF DESCRIPTION OF THE DRAWINGS

In FIGS. 1, 2 and 3, like parts or portions are designated by like numerals.

DETAILED DESCRIPTION OF THE INVENTION

Figure 1:
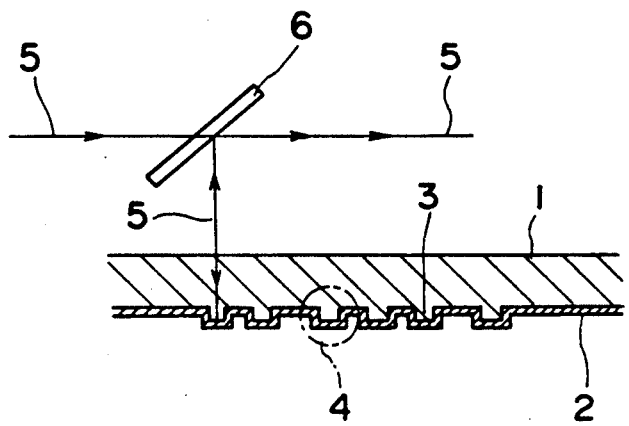
FIG. 1 is a diagrammatic explanatory view illustrating the reading operation of one mode of an optical disc.

According to the present invention, there is provided an optical element substrate comprising a random copolymer comprising (A) a methyl methacrylate unit, (B) an aromatic vinyl compound unit, (C) an unsaturated aliphatic acid unit and (D) a hexagonal acid anhydride unit of the formula:

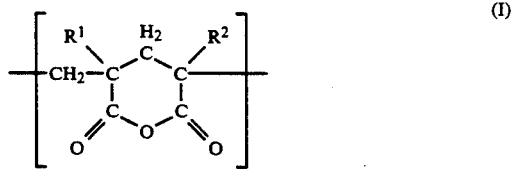

wherein $R^1$ and $R^2$ each independently represent a hydrogen atom or a methyl group, the weight proportions of the units (A), (B), (C) and (D) relative to the total weight of the units (A), (B), (C) and (D) being defined as a, b, c and d, respectively, which satisfy the formulae:

$a+b+c+d=100$, $88.9 \geq a \geq 40$, $56 \geq b \geq 1$, $10 \geq c \geq 1$, and $50 \geq d \geq 9.1$, and wherein the random copolymer has a viscosity of from 2 to 10 cps as measured at 25° C. with respect to a 10% by weight solution of the random copolymer in methyl ethyl ketone.

The methyl methacrylate unit content (a) of the random copolymer is generally in the range of from 40 to 88.9% by weight, preferably from 40 to 75% by weight, based on the weight of the copolymer. When the content is lower than 40% by weight, the ultimate substrate comprised of the copolymer exhibits a disadvantageously high double refraction. The methyl methacrylate unit content is generally lower than 88.9% because of the necessity of the incorporation of other monomeric units into the copolymer. It is preferred that the content be lower than 75% from the viewpoint of attaining a moisture absorption decrease and a dimensional stability improvement for the ultimate optical element substrate.

Examples of aromatic vinyl compound units (B) include those derived from an aromatic vinyl compound such as styrene, α-methylstyrene, p-methylstyrene and a mixture thereof.

The aromatic vinyl compound unit (B) contributes mainly toward the elevation of the deformation temperature of the ultimate optical element substrate and the decrease of the moisture absorption of the substrate. The aromatic vinyl compound unit content (b) of the random copolymer to be employed in the present invention is generally in the range of from 1 to 56% by weight, preferably from 15 to 35% by weight, based on the weight of the copolymer. When the content is less than 1%, the favorable effect of the unit on the above-mentioned moisture absorption decrease is lost, thereby causing the ultimate substrate to exhibit an undesirably high degree of warpage. On the other hand, when the content exceeds 56% by weight, the ultimate optical element substrate exhibits an undesirably high double refraction, and disadvantageously has a residual molding strain.

Examples of unsaturated aliphatic acid units include ethylenically unsaturated aliphatic acid units which are derived from an ethylenically unsaturated aliphatic acid such as acrylic acid, methacrylic acid and a mixture thereof. The unsaturated aliphatic acid unit content of the copolymer is generally in the range of from 1 to 10% by weight, based on the weight of the copolymer. In producing the random copolymer, as described later, a preliminary copolymer comprising methyl methacrylate units, aromatic vinyl compound units and unsaturated aliphatic acid units is first produced and then a cyclization reaction is effected between an unsaturated aliphatic acid unit and the neighboring unsaturated aliphatic acid unit or methyl methacrylate unit to introduce a hexagonal acid anhydride unit of formula (I) as shown hereinbefore into the preliminary copolymer. During this reaction, the total amount of the unsaturated aliphatic acid units of the preliminary copolymer, are not subjected to the ring formation. A certain amount of the unsaturated aliphatic aid units remain unreacted, and hence, the unsaturated aliphatic acid unit content of the copolymer is generally not lower than 1% by weight. On the other hand, when the unsaturated aliphatic acid unit content exceeds 10% by weight, the moisture absorption of the copolymer is high, thereby causing the ultimate optical element substrate to exhibit extreme warpage and poor dimensional stability.

The content (d) of the hexagonal acid anhydride unit of formula (I) in the random copolymer is generally in the range of from 9.1 to 50% by weight, based on the weight of the copolymer. When the content is lower than 9.1%, the heat resistance and thermal stability of the ultimate optical element substrate are poor. On the other hand, when the content exceeds 50% by weight, the copolymer exhibits a poor flowability at the time of molding, thereby causing the ultimate optical element substrate to have an undesirable residual strain. Also, the optical element substrate exhibits a disadvantageously high double refraction.

The sum of the content (c) of the unsaturated aliphatic acid unit and the content (d) of the hexagonal acid anhydride unit in the random copolymer to be employed in the present invention generally satisfies an inequality of $60 \geq c+d \geq 10.1$, preferably $50 \geq c+d \geq 10.1$, more preferably $25 \geq c+d-10.1$, in terms of % by weight based on the weight of the copolymer. When the sum is less than 10.1% by weight, the deformation temperature of the copolymer is undesirably low, thereby causing the ultimate optical element substrate to have undesirable creep properties and to exhibit an unfavorable warpage. Especially, with respect to a lens, it becomes necessary to disadvantageously increase the thickness of the lens in order to cope with the problems brought about by the low deformation temperature of the copolymer. On the other hand, when the sum exceeds 60% by weight, the moisture absorption of the copolymer is high, thereby causing the ultimate optical element substrate to exhibit disadvantageous warpage and double refraction. Moreover, when the sum exceeds 60% by weight, the copolymer has an undesirably low flowability during the time the copolymer is being molded into an optical element substrate.

The molecular weight of the random copolymer to be employed in the present invention is required to be within an appropriate range so that the copolymer has good molding properties as well as a high mechanical strength. In the present invention, the molecular weight of the random copolymer is defined by a solution viscosity for the copolymer, which is correlated with the weight average molecular weight of the copolymer. The random copolymer to be employed in the present invention generally has a viscosity of from 2 to 10 cps, preferably from 3 to 6 cps, as measured at 25° C. with respect to a 10% by weight solution of the copolymer in methyl ethyl ketone. The measurement is carried out by means of a Cannon-Fenske viscometer. When the viscosity is lower than 2 cps, the copolymer is brittle. When the viscosity exceeds 10 cps, the ultimate optical element substrate which is comprised of the copolymer, exhibits an undesirable double refraction and the melt-flow properties of the copolymer are poor, which leads to difficulties in the molding of the copolymer into a substrate for an optical disc having a fine relief structure.

The contents of the respective units (A) to (D) in the random copolymer to be employed in the present invention may be determined according to the following known techniques. The aromatic vinyl compound unit content of the copolymer may be determined by proton NMR. The unsaturated aliphatic acid unit content of the copolymer may be determined by titration with an alkali. The hexagonal acid anhydride unit content of the copolymer may be determined either by $^{13}C$ NMR or by hydrolysis with pressurized water at about 110° C. so as to open the ring, followed by titration. The methyl methacrylate unit content of the copolymer may be determined by infrared spectrophotometry.

The method for producing the random copolymer to be employed in the present invention is not critical. For example, the random copolymer may be produced by conducting solution copolymerization, bulk copolymerization or suspension copolymerization of the above-mentioned methyl methacrylate, aromatic vinyl compound and unsaturated aliphatic acid according to customary procedures, thereby obtaining a preliminary product comprising methyl methacrylate units, aromatic vinyl compound units and unsaturated aliphatic acid units and effecting a cyclization reaction between an unsaturated aliphatic acid unit and the neighboring unsaturated aliphatic acid unit or methyl methacrylate unit.

In conducting the solution copolymerization, it is preferred to employ a solution prepared by dissolving the monomer mixture comprising methyl methacrylate, an aromatic vinyl compound and an unsaturated aliphatic acid in a solvent in a concentration of from 5 to 70% by weight, based on the weight of the solution. A wide variety of solvents may be used in the preparation of the solution. Generally, however, when the concentration of the unsaturated aliphatic acid in the solution is to be 15% by weight or less, it is preferred that an aromatic hydrocarbon such as benzene, toluene, xylene and ethylbenzene and a ketone such as methyl ethyl ketone and methyl isobutyl ketone be employed. On the other hand, when the concentration of the unsaturated aliphatic acid in the solution is to be more than 15% by weight, it is preferred from the viewpoint of the solubility of the resulting copolymer in the solution that an ether such as tetrahydrofuran and an ethylene glycol monoalkyl ether and an alkanol having 1 to 6 carbon atoms such as methanol, ethanol, isopropanol, n-butanol and cyclohexanol be employed.

The bulk copolymerization of methyl methacrylate, an aromatic vinyl compound and an unsaturated aliphatic acid may be initiated by a monomeric free radical formed by heating or by radiation. Also, the bulk copolymerization may be conveniently initiated by the use of a free radical forming catalyst. Examples of free radical forming catalysts include diacyl peroxides such as acetyl peroxide, lauroyl peroxide and benzoyl peroxide; hydroperoxides such as cumene hydroperoxide; alkyl peroxides such as di-t-butyl peroxide; peroxyesters such as t-butyl peroxyacetate, t-butyl peroxylaurate and t-butyl peroxybenzoate; and azo compounds such as 2, 2'-azobisisobutyronitrile.

In the bulk copolymerization, a diluent such as toluene, xylene, ethylbenzene, ethyltoluene, ethylxylene, diethylbenzene and benzene may be added to the monomer mixture comprising methyl methacrylate, an aromatic vinyl compound and an unsaturated aliphatic acid in an amount of from 2 to 20% by weight, based on the monomer mixture, in order to enable the resultant copolymer to have a desired molecular weight.

The suspension copolymerization of methyl methacrylate, an aromatic vinyl compound and an unsaturated aliphatic acid may be initiated by the use of a polymerization initiator which has a low solubility in the reaction medium, e.g. water, used in the suspension copolymerization but has a high solubility in the monomer mixture comprising methyl methacrylate, an aromatic vinyl compound and an unsaturated aliphatic acid. Examples of such polymerization initiators include deacyl peroxide such as acetyl peroxide, lauroyl peroxide and benzoyl peroxide and azo compounds such as 2,2'-azobisisobutyronitrile. A stabilizer optionally together with an auxiliary stabilizer may be added to the reaction system comprising the monomer mixture, the reaction medium and the initiator in order to ensure desirable dispersion of the monomer mixture in the reaction medium. Suitable examples of stabilizers are water-soluble polymers. Customary stabilizers comprising a powdery inorganic compound sparingly soluble in water cannot be suitably employed in the present invention, since they adversely affect the transparency of the resultant copolymer.

In the above copolymerization methods, a molecular weight regulating agent such as a mercaptan, a disulfide, a halide and a terpene may be added to the reaction system comprising methyl methacrylate, an aromatic vinyl compound and an unsaturated aliphatic acid in order to regulate the molecular weight of the resulting copolymer.

The copolymer as obtained by the above copolymerization methods is subjected to a customary cyclization reaction, so that cyclization occurs between an unsaturated aliphatic acid unit within the copolymer and the neighboring unsaturated aliphatic acid unit or methyl methacrylate unit within the copolymer so as to form a hexagonal acid anhydride unit of formula (I), thereby obtaining the random copolymer to be employed in the present invention. With respect to the cyclization reaction, reference may be made to for example, Polymer, vol 1., pages 125 to 134 (1960).

The random copolymer to be employed in the present invention may be produced, for example, as follows. Methyl methacrylate, an aromatic vinyl compound and acrylic acid or methacrylic acid are dissolved in a solvent such as ethylbenzene. To the resulting solution, 1,1-di-t-butylperoxycyclohexane is added as a polymerization initiator, thereby obtaining a reaction system. The reaction system is heated at about 130° C. for a period of time such that the conversion of the monomer mixture to a copolymer comprising a methyl methacrylate unit, an aromatic vinyl compound unit and an acrylic acid or methacrylic acid unit becomes about 50%. Subsequently, the reaction mixture is heated at a high temperature such as about 260° C. under a reduced pressure such as 1 to 10 Torr for 5 to 60 minutes, thereby attaining evaporation of the solvent and any monomer mixture remaining unreacted and simultaneously attaining cyclization due to an intramolecular condensation between an unsaturated aliphatic acid unit within the copolymer and a neighboring unsaturated aliphatic acid unit or methylmethacrylate unit within the copolymer. Thus, a random copolymer to be employed in the present invention is obtained.

In producing the optical element substrate according to the present invention, at least one member selected from the group consisting of a phenol antioxidant, a phosphite antioxidant, a phenol phosphite antioxidant and a thioether antioxidant may be added to the random copolymer as obtained by the above methods in order to improve the heat resistance of the copolymer. Of these antioxidants, a hindered phenol compound having a molecular weight of 350 or more is preferred. The loading amount of the antioxidant is not critical. However, from the viewpoint of obviating trouble, such as bubbling, at the time of molding the copolymer, it is generally preferred that the antioxidant be added to the copolymer in an amount of from 100 to 10,000 ppm by weight relative to the weight of the copolymer.

The term "hindered phenol compound" as used herein is intended to mean a phenol compound having a bulky substituent group at one or both of the ortho-positions.

As a preferred example of the hindered phenol compound, there may be mentioned a phenol compound having a molecular weight of 350 or more and represented by the following general formula

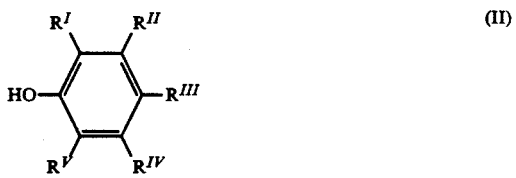
(II)

wherein $R^I$ and $R^{II}$ each independently represent a hydrogen atom or an alkyl group, $R^{III}$ represents an organic substituent group, $R^{IV}$ represents a hydrogen atom and $R^V$ represents a t-butyl group. As the organic substituent group $R^{III}$, there may be mentioned as a preferably example, an organic substituent group containing therein one or more hindered phenol structures.

Specific examples of hindered phenol compounds are given below:
pentaerithrityl-tetrakis[3,5-di-t-butyl-4-hydroxyphenyl)propionate] (molecular weight:1176.6),
1,1,3-tris(2-methyl-4-hydroxy-5-t-butylphenyl)-butane (molecular weight:544.83),
n-octadecyl-3-(4'-hydroxy-3', 5'-di-t-butyl-phenyl)propionate (molecular weight:520.9), tris(3,5-di-t-butyl-4-hydroxybenzyl)isocyanurate (molecular weight:712),
triethylene glycol bis-3-(3-t-butyl-4-hydroxy-5-methylphenyl)propionate (molecular weight:586.8),
4,4'-butylidene-bis(3-methyl-6-t-butylphenol) (molecular weight:382.6),
tris[$\beta$-(3,5-di-t-butyl-4-hydroxyphenyl)propionyloxyethyl]isocyanurate (molecular weight:1045),
4,4'-methylene-bis(2,6-di-t-butyl)phenyl (molecular weight:425),
1,3,5-tri-methyl-2,4,6-tris(3,5-di-t-butyl-4-hydroxybenzyl)benzene (molecular weight:761.1),
hexamethylene glycol bis($\beta$-3,5-di-t-butyl-4-hydroxyphenyl)propionate (molecular weight:524.8), and
bis[3,3-bis(4'-hydroxy-3'-t-butylphenyl)butylic acid]-glycol ester (molecular weight:795).

Additives such as a release agent and an antistatic agent may optionally be added to the copolymer to be used for forming the optical element substrate according to the present invention as long as the additive used does not impair the transparency and any other physical properties of the substrate.

Manufacturing of a substrate for an optical element such as an optical disc, a mirror or a lens from the random copolymer as obtained by the foregoing methods may be conducted according to the customary techniques known in the plastics industry. For example, the optical disc substrate according to the present invention may be manufactured by molding the copolymer into a desired substrate form by means of an injection molding machine, a compression molding, an injection compression molding machine or an extrusion molding machine using dies having an inner surface with a relief structure pattern as mentioned hereinbefore. The mirror and lens substrates according to the present invention may be manufactured by substantially the same method as mentioned above with respect to the optical disc, except that dies having flat inner surfaces are employed. An optical disc, a mirror and a lens may be fabricated from the optical disc, mirror and lens substrates, respectively, according to the customary techniques known in the art. With respect to fabrication of an optical disc and a mirror, it is requisite that a reflective layer generally comprised of a metal be applied to the substrate by the known techniques such as vacuum evaporation coating.

Referring to an optical disc substrate which is a representative example of the optical element substrate according to the present invention, particular explanation is made with respect to the procedures for manufacturing the same and to the properties of the ultimate product.

As mentioned hereinbefore, a substrate comprised of a random copolymer having a viscosity of greater than 20 cps as measured at 25° C. with respect to a 10% by weight solution of the copolymer in methyl ethyl ketone by means of Cannon-Fenske viscometer exhibits a disadvantageously high double refraction. A high double refraction causes the reflectivity of the laser beam for reading the information to inevitably decrease, thereby adversely affecting the reproducibility of the information, when the information recorded on an optical disc comprising the substrate of the copolymer is played back on a playback apparatus. From the viewpoint of the various mechanical restrictions of such a playback apparatus, the double refraction of the substrate for an optical disc is preferably not greater than 100 nm.

It is known that double refraction is defined by various factors, but no clear relations have been established between double refraction and such factors. The present inventors have made intensive and expensive studies. As a result, the present inventors have found clear relations between the type, composition and molecular weight of a copolymer resin and double refraction, and further the present inventors have found a copolymer resin which not only fulfills the requirements described hereinbefore, but also is relatively inexpensive, that is, a resin most suitable for commercial purposes.

Apart from the properties of a copolymer resin, the manufacturing method (molding method) for an optical disc substrate has significant influence on the double refraction of the ultimate optical disc substrate. Of various molding methods such as injection molding, compression molding, injection/compression molding and extrusion molding, the injection molding is the most preferred method for molding an optical disc substrate from the viewpoints of productivity, dimensional accuracy, etc. In injection molding, due to its nature, the physical properties, and also the optical properties of the ultimate molded product in the direction of the resin flow, differ from those in the direction at right angles to the direction of the resin flow. That is, the refractive index in the direction of resin flow (n1) differs from that in the direction at right angles to the direction of resin flow (n2) and the difference $\Delta n = |n1 - n2|$ is the double refraction index. Further, the molding conditions have an influence over the double refraction index $\Delta n$ and the double refraction R. The relation between $\Delta n$ and R is defined by the formula.

$$R = \Delta n \times d$$

wherein d is the thickness of a test sample.

The present inventors have examined the molding temperature which is considered to be of greatest influence over the double refraction. As a result, it has been found that when the molding temperature is increased, the double refraction of the resultant substrate is decreased. However, in this connection, it is to be noted that the increase in the molding temperature is limited. That is, the temperature of the cylinder used for the molding must be less than the heat decomposition temperature of the copolymer resin, and the temperature of the dies used for the molding must be less than the heat distortion temperature of the copolymer resin from the viewpoint of mold release facility.

As a result of trial and error, it has been found that the following molding conditions are suitable for manufacturing an optical disc substrate according to the present invention. The molding temperature is set at a point near the decomposition temperature of the resin.

Injection molding machine: in-line type injection molding machine (Dynameltor M70A D manufactured and sold by MEIKI CO., LTD., Japan)
Disc: disc dies for DAD (for a disc of 120 mm in diameter and 1.2 mm in thickness)
Cylinder temperature: 300° C., 320° C.
Mold temperature: 70° C.

For example, using a random copolymer comprising 65% by weight of methyl methacrylate units, 20% by weight of styrene units, 4% by weight of methacrylic acid units and 11% by weight of hexagonal acid anhydride units and having a viscosity of 5 cps as measured at 25° C. with respect to a 10% by weight solution of the random copolymer in methyl ethyl ketone, molding may be conducted according to the above conditions, thereby obtaining optical disc substrates having pits on one side thereof and exhibiting average double refractions R of 66 nm with the cylinder temperature is 300° C. and of 30 nm when the cylinder temperature is 320° C.

In order to fabricate an optical disc from the optical disc substrate, a reflective layer of a metal layer is formed on the side of the disc substrate having the pits by the use of known coating techniques such as vacuum evaporation coating. Examples of metals for forming the reflective metal layer include aluminum, gold, platinum, silver and copper. Of these, aluminum is preferred because of the low cost of the metal.

The structure of the optical disc comprising the substrate of the present invention will be illustratively described with reference to the accompanying drawings.

Figure 2:
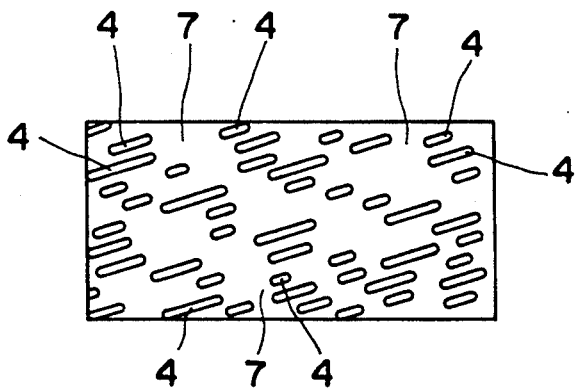
FIG. 2 is an enlarged diagrammatic plan view of a portion of one form of an optical disc.

Referring to FIG. 1, numeral 1 indicates the copolymer substrate according to the present invention, numeral 2 indicates a metal reflective layer laminated by known coating techniques such as vacuum evaporation coating, and numeral 3 indicates a convex portion of copolymer substrate layer 1. Convex portion 3 of copolymer substrate layer 1 corresponds to pit 4 of metal reflective layer 2. Pit 4 is designed so as to have a width of form about 1.0 to 1.5 μm, a depth of form about 0.1 to 0.2 μm and a length of from about 1.0 to 1.6 μm. Pits 4 are closely arranged along a track which has an eddy as viewed from the top. An enlarged plan view of the arrangement of the pits is shown in FIG. 2, in which numeral 7 indicates flat portions of metal reflective layer 2. As shown in FIG. 1, when laser beam 5 is directed to semitransparent mirror 6, half of the beam goes straight traversing the mirror. On the other hand, the other half of the beam goes vertically into copolymer substrate layer 1 to be reflected by metal layer 2, with the reflected beam returning to semitransparent mirror 6. The returned beam is reflected by semitransparent mirror 6 and follows the same path as the other half of the beam which has traversed transparent mirror 6. Accordingly, an optical-path difference (phase difference) from the reflection portion of the laser beam according to the concavoconvex pattern of metal reflective layer 2 is brought about between the half of the beam going straight through semitransparent mirror 6 and the other half of the beam having undergone reflection on metal layer 2 and advanced by way of semitransparent mirror 6. When the optical disc is rotated, the laser beam vertically getting into substrate layer 1 is caused to hit on pits 3 in sequence according to the arrangement of pits 3. Therefore, the reflection of laser beam 5 is varied in accordance with the arrangement of pits 3 and, hence, the intensity of laser beam returns to a detector through semitransparent mirror 6 is varied. Thus, the information recorded on the optical disc in the form of pits is detected in the form of variation in intensity of the laser beam returning to the detector. The thus detected signals are converted into electrical signals and then played back as sound or the like.

Figure 3:
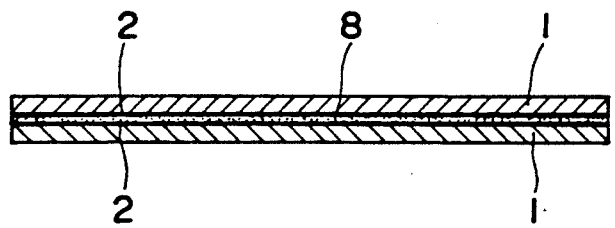
FIG. 3 is a diagrammatic cross-sectional view of another form of an optical disc in which both the front and back sides can be used for information recording.

A diagrammatic cross-sectional view of another form of an optical disc is shown in FIG. 3, in which both the front and back sides can be used for information recording. This optical disc may be manufactured by bonding together two optical discs of the type described above using adhesive 8 in a manner such that the metal layers of the discs are adhered to each other.

The properties of the optical disc substrate of the present invention satisfy the following requirements which an optical disc substrate is desired to meet.

| Optical properties | |
|---|---|
| Transmittance of a laser beam having a wave length of 630 nm or 840 nm (resin thickness: 2.5 to 3.0 mm) | 90% or more |
| Double refraction | 100 nm or less |
| Refractive index | 1.5 ± 0.1 |
| Contaminants | none |
| Physical characteristics | |
| Heat distortion temperature | 100° C. or more |
| Susceptibility to vacuum evaporation coating of aluminum | Good |
| Moldability | Good |
| Dimensional accuracy and stability | |
| Thickness distribution | ±0.1 mm |
| Warpage (after 72 hr. at 45° C., 90% RH) | 0.4 mm or less |

As is apparent from the foregoing description and the following Examples, the optical element substrate according to the present invention has excellent heat resistance, thermal stability, transparency, resistance to scratching and metal layer corrosion preventive properties and exhibits advantageously low double refraction and warpage. This novel substrate can advantageously be employed as a substrate for an optical element such as an optical disc including a digital audio disc, a video disc and a disc capable of being directly read after recording, a mirror, a lens and the like.

The optical and physical properties as indicated above and in Examples and Comparative Examples which will be given later were evaluated as follows.

[1] Double refraction (the following items (1), (2) and (3) correspond to items (1), (2) and (3) in Table 2 which will be given later):

(1) Double refraction before storage: A substrate for an optical disc having no pits thereon (diameter: 120 mm, thickness: 1.2 mm) is prepared by molding. The disc is subjected to measurement of the double refraction in terms of retardation of He-Ne laser beam after double passes through the element by the Senarmont compensator method using a polarization microscope, XTP-11 (manufactured and sold by NIPPON KOGAKU K.K., Japan). The criteria are as follows.

O: less than 100 nm
X: 100 nm or more (2) Double refraction after storage: The above-mentioned double refraction measurement is effected after allowing the disc to stand at 60° to 70° C. for 7 days.

O: Double refraction increase is within 1%.
X: Double refraction increase is more than 20%.

(3) Dependency of double refraction on the angle of the incident He-Ne laser beam:

O: The double refraction is not dependent on the angle of the incident laser beam.
X: The double refraction greatly increases depending on deviation in angle of the incident laser beam from the angle normal to the surface of the substrate.

[2] Heat resistance:

The heat resistance is evaluated in terms of heat distortion temperature. The heat distortion temperature (°C) is determined in accordance with JIS K 7207 under a load of 18.6 kg/cm². The criteria are as follows.

O: 100° C. or more
X: less than 100° C.

[3] Mold-pattern transferability:

Using dies with an inner surface having pits each of 1 μm in width, 1-1.6 μm in length and 0.1-0.2 μm in depth, a copolymer is molded into an optical disc substrate Transferability of the pit pattern of the dies to the substrate is visually evaluated using a microscope. The criteria are as follows.

O: Pit pattern is completely transferred.

Δ: There are places where the pit pattern is well transferred and also places where the transferability of the pit pattern is poor on the substrate.

X: Transferability of the pit pattern is poor.

[4] Transparency (Transmittance of a laser beam):

The transmittance (%) of a laser beam is determined in accordance with JIS K 6718 (method A) using an intergrating-sphere photometer.

O: 90% or more
X: less than 90%

[5] Contaminants:

A copolymer is injection molded to prepare a plate of 2.5 mm in thickness. With respect to an area of 200 cm$^2$ of the plate, the number and size of contaminants are measured using a standard spot size gauge of Society of Radio Communication Machine Industry. When the number of contaminants having a diameter of 0.2 mm or more is 1 or less, it is evaluated that the plate has substantially no contaminants. The criteria are as follows.

O: No contaminants
X: Contaminants are present.

[6] Adhesion to reflective layer formed by vacuum evaporation coating:

An aluminum coating layer having a thickness of 1000 Å is formed under a pressure of $10^{-4}$ to $10^{-5}$ Torr on a substrate by the customary vacuum evaporation coating technique. Then, cut lines are drawn on the aluminum layer using a cutter in a lattice pattern, followed by a peel test using an adhesive tape, which is stuck to the cut lined layer and to which peeling force is applied. The criteria are as follows.

O: No peel occurred
X: Peel occurred.

[7] Corrosion preventive property:

A reflective layer of aluminum is coated on a substrate. Subsequently, an acrylic resin coating is applied onto the reflective layer, and crosslinking of the coating is conducted by irradiation of UV rays (UV coating). The resultant element is subjected to an environmental test at 65° C. under 90% RH for 1000 hr. to examine the corrosion in the reflective layer. The criteria are as follows.

O: Not corroded.
X: Corroded.

[8] Warpage:

(1) Optical disc

An optical disc is prepared by forming a pits-having substrate having a diameter of 12 cm and a thickness of 1.2 to 1.5 mm and then applying to one surface thereof an aluminum film and further a UV coating. The thus prepared optical disc is put on a plate and allowed to stand at 45° C. under 90% RH for 72 hr. Then, the warpage (mm) of the disc is measured. The criteria are as follows.

O: less than 0.4 mm
X: 0.4 mm or more (2) Mirror

A mirror is placed on the tops of two supports having the same height which are placed apart on a flat table. The height between the lower surface of the mirror and the surface of the table is measured by a dial gauge placed at the middle between the supports. This measurement is conducted before and after an environmental test at 23° C. under 80% RH for 22 days, and the difference in height is defined as warpage. The criteria are as follows.

O: less than 0.4 mm
X: 0.4 mm or more

[9] Mechanical strength:

Flexural strength (as measured according to ASTM D790)

O: 500 kg/cm$^2$ or more
X: less than 500 kg/cm$^2$

Tensile strength (as measured according to JIS K6870)

O: 300 kg/cm$^2$ or more
X: less than 300 kg/cm$^2$

[10] Thermal stability test:

A tip having a length of 90 mm, a width of 49 mm and a thickness of 3 mm is molded by means of an injection molding machine [manufactured and sold by KATO SEISAKUSHO, Japan, model: K170S, capacity: 2.50 oz, screw structure: Dulmage two stage head (L/D=20)] in a manner as follows. Pellets of a copolymer resin are fluxed by a screw while pulling back the nozzle, and then the revolution of the screw is stopped so as to cause the fluxed resin to be kept therein for 20 min. Then, the nozzle is moved forward and, after nozzle touch, the resin is injection molded into the tip. The resultant tip is examined as to whether o not it has bubble voids and silver streaks. The criteria are as follows.

O: There are substantially no void and no silver streak.
X: There are several voids of several mm in diameter, and several silver streaks.

[11] Rockwell hardness

Rockwell hardness is measured according to ASTM D785-65 method (corresponding to JIS K7202).

[12] Pencil hardness (resistance to scratching)

Pencil hardness (resistance to scratching) is evaluated according to JIS K5401 in terms of hardness of a pencil which can make scratches on an optical element substrate. A test sample is scratched with a pencil of a certain hardness five times at different portions, and if the sample suffers two or more scratches, the pencil is changed to another having a hardness which is 1-level lower by hardness index than the same. The hardness of the pencil with which the sample suffers no scratch or only one scratch is regarded as the pencil hardness of the sample. The criteria are as follows.

O: H or more in hardness
X: B or less in hardness

DETAILED DESCRIPTION OF THE PREFERRED EMBODIMENTS

This invention will now be described in detail with reference to the following Examples and Comparative Examples but they should not be construed to be limiting the scope of the present invention. In the Examples and Comparative Examples, all of "parts" and "% (percent)" are given on a weight basis unless otherwise indicated.

EXAMPLE 1

A mixture was obtained by mixing 18% of styrene, 11% of methacrylic acid (MAA), 71% of methyl methacrylate (MMA), 10% of methyl ethyl ketone and 0.1% of tert-dodecylmercaptan. To the mixture was added n-octadecyl-3-(4'-hydroxy-3',5'-di-t-butylphenyl)propionate as an additive so that the concentration thereof became 1,000 ppm. The resultant mixture was continuously fed at a flow rate of 1 l/hr to a 2-liter perfect-mixing reactor having a jacket, where copolymerization was effected at 126° C. using 1,1-di-tert-butylperoxy-3,3,5-trimethylcyclohexane as an initiator. After completion of the copolymerization reaction, the reaction mixture having a solid content of 40% was continuously fed to a high temperature vacuum chamber, thereby removing the monomers remaining unreacted and effecting cyclization reaction so as to form a copolymer having hexagonal anhydride units.

The content of each unit of the thus obtained copolymer was determined by titration, NMR and infrared spectrophotometry. As a result, it was found that the copolymer consisted of 20% of styrene units, 65% of methyl methacrylate units, 4% of methacrylic acid units and 11% of hexagonal acid anhydride units. Further, the copolymer had a solution viscosity of 4.5 cps as measured at 25° C. with respect to a 10% solution of the copolymer in methyl ethyl ketone using Cannon-Fenske viscometer No. 200. Then, the copolymer was pulverized, and kept at 270° C. under a stream of nitrogen in a heating oven for 4 hr, followed by cooling under a stream of nitrogen. By measuring the solution viscosity of the thus obtained pulverized copolymer in the same manner as mentioned above, it was found that the viscosity of the copolymer remained to be 4.5 cps.

The copolymer was subjected to tests by which the suitability of the copolymer for an optical disc substrate was evaluated. The particulars of the copolymer and test results of the tests are shown in Table 2.

EXAMPLES 2 to 10

Copolymerization reaction and the subsequent treatments of the copolymer were effected in substantially the same manner as in Example 1 except that the proportions of the three monomers were varied as shown in Table 2. The particulars of the polymers and test results of the tests are shown in Table 2.

COMPARATIVE EXAMPLES 1 and 2

A polycarbonate resin [Panlite (trade mark) AD 5503, manufactured and sold by TEIJIN CHEMICALS, LTD., Japan] and PMMA [Delpet (trade mark) 98A, manufactured and sold by ASAHI CHEMICAL INDUSTRY COL., LTD., Japan; having a solution viscosity of 10 cps as measured at 25° C. with respect to a 10% solution of the copolymer in methyl ethyl ketone] were subjected to measurements of the same properties as measured in Example 1. The results are summarized in Table 2.

COMPARATIVE EXAMPLES 3 to 10

Copolymers as defined in Table 2 were prepared. The prepared copolymers were subjected to measurements of the same properties as measured in Example 1. The results are summarized in Table 2.

TABLE 2

| | | Methyl methacrylate units (wt %) | Aromatic vinyl compound units (wt %) | Unsaturated aliphatic acid units (wt %) | Hexagonal anhydride units (wt %) | 4) Solution viscosity (cps) | Additive Name | Additive Molecular weight | Additive Concentration |
|---|---|---|---|---|---|---|---|---|---|
| Example | 1 | MMA 65 | St 20 | MAA 4 | 11 | 4.5 | 1) | 520.9 | 1,000 |
| " | 2 | MMA 55 | St 25 | MAA 5 | 15 | 4.9 | 1) | " | 2,000 |
| " | 3 | MMA 50 | St 23 | MAA 7 | 20 | 3.5 | 1) | " | 1,000 |
| " | 4 | MMA 55 | St 30 | MAA 5 | 10 | 4.7 | 1) | " | 500 |
| " | 5 | MMA 65 | St 15 | MAA 7 | 13 | 3.9 | 1) | " | 1,000 |
| " | 6 | MMA 60 | St 10 α-MeSt 16 | MAA 2 | 12 | 4.1 | 2) | 1,176.6 | 1,000 |
| " | 7 | MMA 65 | St 20 | AA 4 | 11 | 5.4 | 2) | " | 1,000 |
| " | 8 | MMA 60 | St 7 p-MeSt 15 | MAA 5 | 13 | 4.8 | 2) | " | 1,500 |
| " | 9 | MMA 55 | St 21 | MAA 4 | 20 | 4.6 | 2) | " | 500 |
| " | 10 | MMA 70 | St 13 | MAA 5 | 12 | 5.7 | 2) | " | 1,000 |
| Comparative Example 1 | | PC 100 | — | — | — | — | — | — | — |
| Comparative Example 2 | | PMMA 100 | — | — | — | 10 | — | — | — |
| Comparative Example 3 | | MMA 35 | St 45 | MAA 7 | 13 | 4.5 | 1) | 520.9 | 1,000 |
| Comparative Example 4 | | MMA 90 | St 1 | MAA 2 | 7 | 5.3 | Not added | — | 0 |
| Comparative Example 5 | | MMA 30 | α-MeSt 15 St 25 | MAA 5 | 25 | 4.8 | 2) | 1,176.6 | 50 |
| Comparative Example 6 | | MMA 53 | St 43 | MAA 1 | 3 | 4.3 | 2) | 1,176.6 | 500 |
| Comparative Example 7 | | MMA 59 | St 33 | MAA 3 | 5 | 3.9 | 2) | " | 1,000 |
| Comparative Example 8 | | MMA 60 | St 26 | MAA 3 | 11 | 1 | 2) | " | 1,500 |
| Comparative Example 9 | | MMA 60 | St 26 | MAA 3 | 11 | 20 | 1) | 520.9 | 1,000 |
| Comparative Example 10 | | MMA 50 BMA 12 3) | St 35 | MAA 0.3 | 2.7 | 4.1 | 1) | " | 1,000 |

| Properties of optical discs | | | |
|---|---|---|---|
| Mold-pattern | Adhesion | Corro- | Ther- |

TABLE 2-continued

| | | Double refraction | | Heat resis- | trans- fer- | Trans- par- | Con- tami- | to re- flective | sion pre- ventive | Warp- | Me- chanical | mal sta- |
|---|---|---|---|---|---|---|---|---|---|---|---|---|
| | | (1) | (2) | (3) | tance | ability | ency | nants | layer | property | age | strength | bility |
| Example | 1 | ○ | ○ | ○ | ○ | ○ | ○ | ○ | ○ | ○ | ○ | ○ | ○ |
| " | 2 | ○ | ○ | ○ | ○ | ○ | ○ | ○ | ○ | ○ | ○ | ○ | ○ |
| " | 3 | ○ | ○ | ○ | ○ | ○ | ○ | ○ | ○ | ○ | ○ | ○ | ○ |
| " | 4 | ○ | ○ | ○ | ○ | ○ | ○ | ○ | ○ | ○ | ○ | ○ | ○ |
| " | 5 | ○ | ○ | ○ | ○ | ○ | ○ | ○ | ○ | ○ | ○ | ○ | ○ |
| " | 6 | ○ | ○ | ○ | ○ | ○ | ○ | ○ | ○ | ○ | ○ | ○ | ○ |
| " | 7 | ○ | ○ | ○ | ○ | ○ | ○ | ○ | ○ | ○ | ○ | ○ | ○ |
| " | 8 | ○ | ○ | ○ | ○ | ○ | ○ | ○ | ○ | ○ | ○ | ○ | ○ |
| " | 9 | ○ | ○· | ○ | ○ | ○ | ○ | ○ | ○ | ○ | ○ | ○ | ○ |
| " | 10 | ○ | ○ | ○ | ○ | ○ | ○ | ○ | ○ | ○ | ○ | ○ | ○ |
| Comparative Example 1 | | ○ | X | X | ○ | Δ | X | ○ | ○ | X | ○ | ○ | ○ |
| Comparative Example 2 | | ○ | ○ | ○ | X | ○ | ○ | ○ | ○ | ○ | X | ○ | ○ |
| Comparative Example 3 | | X | ○ | ○ | ○ | ○ | ○ | ○ | ○ | ○ | ○ | ○ | ○ |
| Comparative Example 4 | | ○ | ○ | ○ | ○ | ○ | ○ | ○ | ○ | ○ | X | ○ | X |
| Comparative Example 5 | | X | ○ | ○ | ○ | ○ | ○ | ○ | ○ | ○ | ○ | ○ | ○ |
| Comparative Example 6 | | ○ | ○ | ○ | X | ○ | ○ | ○ | ○ | ○ | X | ○ | ○ |
| Comparative Example 7 | | ○ | ○ | ○ | X | ○ | ○ | ○ | ○ | ○ | X | ○ | ○ |
| Comparative Example 8 | | ○ | ○ | ○ | ○ | ○ | ○ | ○ | ○ | ○ | ○ | X | ○ |
| Comparative Example 9 | | X | ○ | ○ | ○ | X | ○ | ○ | ○ | ○ | ○ | ○ | ○ |
| Comparative Example 10 | | ○ | ○ | ○ | X | ○ | ○ | ○ | ○ | ○ | X | ○ | ○ |

Note
1) n-octadecyl-3-(4'-hydroxy-3',5'-di-ti-butylphenyl)propionate
2) pentaerystyl-tetrakis[3-(3,5-di-t-butyl-4-hydroxyphenyl)propionate]
3) butyl methacrylate
4) Solution viscosity as measured at 25° C. with respect to a 10% solution of the copolymer in methyl ethyl ketone

EXAMPLES 11 AND COMPARATIVE EXAMPLE 11

A copolymer consisting of 65% of MMA units, 20% of styrene units, 4% of methacrylic acid units and 11% of hexagonal acid anhydride units and having a solution viscosity of 4.5 cps as measured at 25° C. with respect to a 10% solution of the copolymer in methyl ethyl ketone was prepared. To the copolymer, n-octadecyl-3-(4'-hydroxy-3',5'-di-t-butylphenyl)propionate was added as an antioxidant in a concentration of 1,000 ppm. The resultant copolymer composition was injection molded at 255° C. into a substrate for a mirror.

Separately, for comparison, a polymethacryl resin (Delpet 80N, manufactured and sold by ASAHI CHEMICAL INDUSTRY CO., LTD., Japan) was injection molded at 240° C. into a substrate for a mirror.

A reflective layer having a thickness of about 1,000 Å of aluminum was formed on each of the thus obtained substrates by vacuum evaporation coating under a pressure of $1 \times 10^{-4}$ Torr, thereby obtaining mirrors each having a size of 230 mm × 60 mm × 3 mm. The thickness of the aluminum layers was obtained by controlling the vacuum evaporation time.

When each of the above obtained mirrors was subjected to the measurement of warpage, the mirror comprised of the substrate made of the polymethacryl resin was found to have a warpage of about 5 mm. Such a mirror is disadvantageous because a considerable distortion would be caused in the reflected image. By contrast, the mirror comprised of the substrate according to the present invention was found to have a warpage of 0.2 mm or less, substantially not affecting the reflected image and causing no glare.

EXAMPLE 12 AND COMPARATIVE EXAMPLES 12 AND 13

A copolymer consisting of 65% of MMA units, 20% of styrene units, 4% of methacrylic acid units and 11% of hexagonal acid anhydride units and having a solution viscosity of 4.5 cps as measured at 25° C. with respect to a 10% solution of the copolymer in methyl ethyl ketone was prepared. To the copolymer, n-octadecyl-3-(4'-hydroxy-3',5'-di-t-butylphenyl)propionate was added as an antioxidant in a concentration of 1,000 ppm. The resulting copolymer composition was injection molded at 290° C. into a substrate for a convex lens having a diameter of 15 cm and a maximum thickness of 2.5 cm.

Separately, for comparison, a polymethacryl resin (Delpet 80N, manufactured and sold by ASAHI CHEMICAL INDUSTRY CO., LTD., Japan) and a polycarbonate resin (Panlite 1250, manufactured and sold by TEIJIN CHEMICALS, LTD., Japan) were injection molded at 250° C. and 330° C., respectively, into lens substrates each having a diameter of 15 cm and a maximum thickness of 2.5 cm.

Subsequently, the above obtained lenses were subjected to measurements of transparency, heat resistance and hardness. The results are shown in Table 3.

TABLE 3

| | Trans- parency | Heat resistance | Hardness | |
|---|---|---|---|---|
| | | | Rockwell hardness | Pencil hardness |
| Copolymer resin of the present invention | ○ | ○ | ○ | ○ |
| Polymethacryl resin (Delpet 80N) | ○ | X | ○ | ○ |
| Polycarbonate resin | X | ○ | X | X |

TABLE 3-continued

| | Trans- parency | Heat resistance | Hardness | |
| | | | Rockwell hardness | Pencil hardness |
|---|---|---|---|---|
| (Panlite 1250) | | | | |

In addition, since the polymethacryl resin had a refractive index of as small as 1.49, the focal length of the lens substrate made of the polymethacryl resin was long and the thickness thereof was inevitably large. By contrast, since the lens substrate according to the present invention had a refractive index as high as 1.521, the focal length of the lens was short and the thickness thereof was advantageously small.

What is claimed is:

1. An optical disc substrate comprising a tetrapolymer of (A) a methyl methacrylate unit, (B) an aromatic vinyl compound unit, (C) an unsaturated aliphatic acid unit and (D) a hexagonal acid anhydride unit of the formula:

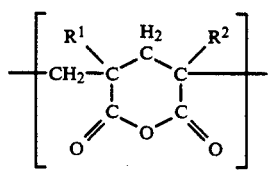

wherein $R^1$ and $R^2$ each independently represent a hydrogen atom or a methyl group, the weight proportions of said units (A), (B), (C), and (D) relative to the total weight of said units (A), (B), (C), and (D) being defined as a, b, c and d, respectively, which satisfy the formulae:

$a+b+c+d=100$, $88.9 \geq a \geq 50$, $56 \geq b \geq 1$, $10 \geq c \geq 2$, and $50 \geq d \geq 10$, and wherein sand random copolymer has a viscosity of from 2 to 10 cps as measured at 25° C. with respect to a 10% by weight solution of the random copolymer in methyl ethyl ketone.

2. The substrate according to claim 1, wherein said c and d satisfy an inequality of $50 \geq c+d \geq 10.1$.

3. The substrate according to claim 1, wherein said proportions a, b, c and d satisfy the formulae:

$75 \geq a \geq 40$, $35 \geq b \geq 15$, $10 \geq c \geq 2$, $20 \geq d \geq 10$, and $25 \geq c+d \geq 12$.

4. The substrate according to claim 1, wherein at least one member selected from the group consisting of a phenol antioxidant, a phosphite antioxidant, a phenol phosphite antioxidant and a thioether antioxidant is present in said random copolymer in an amount of from 100 to 10,000 ppm by weight relative to the weight of the copolymer.

5. The substrate according to claim 4, wherein said phenol antioxidant is a hindered phenol compound having a molecular weight of 350 or more.

6. The substrate according to claim 1, wherein said aromatic vinyl compound unit is derived from at least one member selected from the group consisting of styrene, α-methylstyrene and p-methylstyrene.

7. The substrate according to claim 1, wherein said unsaturated aliphatic acid unit is an ethylenically unsaturated aliphatic acid unit.

8. The substrate according to claim 7, wherein said ethylenically unsaturated aliphatic acid unit is derived from at least one member selected from the group consisting of acrylic acid and methacrylic acid.

9. The substrate according to claim 1, wherein said c and said d satisfy the inequalities:

$10 \geq c \geq 2$, and $20 \geq d \geq 10$.

10. An optical disc which comprises:
an optical disc substrate comprising a tetrapolymer of (A) a methyl methacrylate unit, (B) an aromatic vinyl compound unit, (C) an unsaturated aliphatic acid unit and (D) a hexagonal acid anhydride unit of the formula:

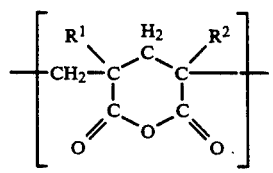

wherein $R^1$ and $R^2$ each independently represent a hydrogen atom or a methyl group, the weight proportions of said units, (A), (B), (C), and (D), relative to the total weight of said units (A), (B), (C), and (D) being defined as a, b, c and d, respectively, which satisfy the formulae:

$a+b+c+d=100$, $88.9 \geq a \geq 50$, $56 \geq b \geq 1$, $10 \geq c \geq 2$, and $50 \geq d \geq 10$, and wherein sand random copolymer has a viscosity of from 2 to 10 cps as measured at 25° C. with respect to a 10% by weight solution of the random copolymer in methyl ethyl ketone; and a metal layer capable of reflecting a laser beam formed on said optical disc substrate.

11. The optical disc according to claim 10, which is a direct read after write (DRAW) disc or an erasable direct read after writer (E-DRAW) disc.

* * * * *